United States Patent [19]

Lark

[11] Patent Number: 6,096,802
[45] Date of Patent: *Aug. 1, 2000

[54] STABILIZATION OF ENCAPSULATED COLLOIDAL METAL OXIDES

[75] Inventor: John C. Lark, Marietta, Ga.

[73] Assignee: Callaway Corporation, Columbus, Ga.

[*] Notice: This patent is subject to a terminal disclaimer.

[21] Appl. No.: 09/327,144

[22] Filed: Jun. 7, 1999

Related U.S. Application Data

[63] Continuation-in-part of application No. 09/127,841, Aug. 4, 1998, Pat. No. 5,965,636.

[51] Int. Cl.[7] .............................. C08K 9/10; C08K 3/20; B05D 3/10
[52] U.S. Cl. .................. 523/206; 523/205; 523/207; 523/209; 523/210; 523/216; 427/389.9
[58] Field of Search .................................. 523/205, 206, 523/207, 209, 210, 216; 427/389.9

[56] References Cited

U.S. PATENT DOCUMENTS 5,965,636  10/1999  Lark ........................ 523/207

*Primary Examiner*—Peter A. Szekely
*Attorney, Agent, or Firm*—Bruce F. Jacobs

[57] ABSTRACT

The stability of colloidal metal oxide particles which have been encapsulated in a polymer resin is extended by the addition of a water-soluble polyacrylamide polymer.

27 Claims, No Drawings

STABILIZATION OF ENCAPSULATED COLLOIDAL METAL OXIDES

CROSS-REFERENCE TO RELATED APPLICATION

This application is a continuation-in-part of U.S. Ser. No. 09/127,841, filed Aug. 4, 1998, now U.S. Pat. No. 5,965,636.

FIELD OF THE INVENTION

The present invention relates to the stabilization of encapsulated colloidal metal oxide particles by the addition of a watersoluble polyacrylamide polymer. The resulting stabilized complex is particularly useful as a fiber treatment, more particularly as a size in the textile industry.

BACKGROUND OF THE INVENTION

The preparation and use of polymer resin encapsulated metal oxides, particularly silica, in textile sizings to promote fiber to fiber cohesion has been demonstrated in U.S. Pat. Nos. 4,728,679 and 4,997,862. These encapsulated colloidal materials, although effective sizing agents for textiles, particularly in combination with other sizing agents such as starch or polyvinyl alcohol, have found limited commercial application. Use has been limited to situations in which the encapsulated material can be formed on site immediately prior to its application at elevated temperature onto warp yarn. This procedure was required to minimize the period of time during which the natural tendency of the metal oxide particles to disassociate and form large 3-dimensional inorganic polymer networks can occur. When a 3-dimensional inorganic polymer network is formed, it destroys the desirable small particle size and high surface area features of the colloidal metal oxide particles and generates larger particles which are both abrasive to metal and ceramic surfaces and contain areas of entrapped encapsulating polymer resin within the 3-dimensional inorganic polymer network.

Generally, the aqueous polymer resin encapsulated colloidal metal oxide compositions of U.S. Pat. Nos. 4,728,679 and 4,997,862 containing about 20% by weight and higher solids are stable at room temperature for only a few days before substantial viscosity build-up occurs, leading to complete gelation within 2–3 weeks. While, the encapsulated colloidal particle complex can be prepared in dry form by spray drying, doing so is expensive and the resulting material is of very low density which restricts packaging to 75–80% of standard packaging weights.

Accordingly, it is an object of the present invention to enhance the stability of polymer resin encapsulated colloidal metal oxide particles in a liquid system, both at room temperature and at elevated temperature.

It is a further object to enhance the stability of the encapsulated colloidal metal oxide particles while maintaining and/or improving the performance of the particles as textile sizing agents.

These and still further objects will be apparent from the following description of the present invention.

SUMMARY OF THE INVENTION

It has now been discovered that concentrated aqueous solutions of polymer resin encapsulated colloidal metal oxide particles may be stabilized by the incorporation of a water soluble polyacrylamide polymer. Concentrated systems contain about 10% or more, preferably about 15% or more, encapsulated metal oxide particle solids by weight.

DESCRIPTION OF THE PREFERRED EMBODIMENTS

The polymer resin encapsulated colloidal metal oxide particles of this invention are those prepared and described in U.S. Pat. Nos. 4,728,679 and 4,997,862, the subject matters of which are incorporated herein by reference.

While any metal oxide particle may be used, preferred metal oxide particles suitable for the present invention include silica, tin oxide, and antimony pentoxide. Most preferably, particularly for use in fiber treatments, the metal oxide is silica. Generally the particles have average particle diameters in the range of about 4 to about 100 nanometers, preferably about 10 to 50 nanometers.

The polymer resins to be used in the present invention are those which will form a sufficiently complete film around the colloidal metal oxide particles to prevent the particles from disassociating from the polymer resin to form large 3-dimensional inorganic polymer networks. Such polymer resins include polyester polymer resins, particularly those having a number average molecular weight of about 1,500 to about 7,000 daltons. Preferably, the polyester polymer resin is prepared from isophthalic acid, diethylene glycol, and trimellitic anhydride, as disclosed in U.S. Pat. No. 4,268,645, the subject matter of which is incorporated herein by reference, neutralized conventionally with an amine-containing material to render the polymer resin reducible in water. Suitable such amines include monoisopropylamine and N-methylethanolamine. Other aromatic and aliphatic diacids or diacid sources, such as phthalic anhydride, hexane dioic acid, maleic acid, maleic anhydride, and the like may be used to form the polyester resin.

The ratio of polymer resin to metal oxide particles must be sufficiently high to result in substantially complete encapsulation or occlusion of the metal oxide particles in the polymer resin so that the metal oxide particles remain substantially discrete, rather than agglomerating. A simple test to confirm the adequacy of a polymer resin entails burning off (heating to e.g. 600° C. for 1–3 hours) a dry sample of encapsulated metal oxide particles and observing the resulting fired residue. If a sufficient amount of a suitable polymer resin has been used, the resulting residue is very fine and white. If an insufficient amount of a suitable polymer resin (or an unsuitable polymer resin) is used, the resulting residue is black due to the presence of trapped polymer resin within 3-dimensional metal oxide structure.

The amount of polymer resin required for a specific metal oxide particle composition depends upon the particle size of the metal oxides since smaller particles have higher surface areas and require higher amounts of polymer resin. Generally, however, the polymer resin is used in an amount of about 3 to 15, preferably about 4 to 10, times the weight of the metal oxide particles, i.e. on a solids to solids basis.

As indicated, when the encapsulated colloidal metal oxide particles are present in an aqueous solution, particularly one at elevated temperature, the metal oxide particles naturally tend to disassociate from the polymer and then form large more stable 3-dimensional networks. It has been found that this natural tendency is overcome (or vastly retarded) by the addition of a polyacrylamide polymer, generally in the form of an aqueous solution thereof.

Suitable watersoluble polyacrylamide polymers are generally homopolymers of acrylamide or methacrylamide. While the polymers are preferably produced in a solution polymerization procedure, other polymerization techniques, e.g. bulk, suspension, emulsion or inverse emulsion, may also be used. The water soluble polyacrylamide polymers have a low molecular weight as evidenced by a viscosity of a 20 wt % aqueous solution thereof being about 100 to 15,000 cps. Preferred solution polymerized polyacrylamide polymers generally have viscosity of only about 400 to about 2,500 cps, more preferably about 500 to about 1,000 cps, as determined by a Brookfield RVT Viscometer at 25° C. using spindle #3 at 50 RPM. Another suitable polyacrylamide polymer is available from Ciba Corporation as Colsize-WLV. This polymer exhibits a Brookfield viscosity of about 5–8,000 cps at 20% solids.

Although a small amount of acid groups may be present due to copolymerization or by hydrolysis of the amide groups, care should be taken to minimize any substantial amount of hydrolysis of the polyacrylamide polymer since the presence of a large number of acid groups has been found to be deleterious to the performance of the sizing agent, particularly in a high moisture level environment as is common in weaving rooms.

Any conventional acrylamide polymerization technique may be used to prepare the polyacrylamide polymers used herein. Preferably, acrylamide monomers are solution polymerized in an aqueous medium, under an inert atmosphere, and in the presence of a catalytic amount of a free-radical source such as ammonium persulfate, ammonium persulfate, sodium bisulfite, and the like. The reaction mixture is stirred under the inert atmosphere until the polymerization is completed. The resulting product is a slightly viscous solution which, depending upon its solids content, may be directly used in the present invention or may be diluted to a lower solids level. A particularly suitable polyacrylamide solution polymer is available from Callaway Chemical Company, Columbus, Ga., as Callaway 4600.

The polyacrylamide stabilized polymer resin encapsulated colloidal metal oxide particles may be prepared by simply combining the three components and mixing until a homogeneous system is formed. Alternatively, the polyacrylamide polymer can be added to a previously prepared polymer resin encapsulated colloidal metal oxide particle composition. In either case, the polyacrylamide polymer is used in an amount sufficient to increase the stability of the polymer resin encapsulated colloidal metal oxide particles over compositions not containing the polyacrylamide polymer. Generally, the weight ratio of polyacrylamide polymer to polymer resin encapsulated metal oxide particles is in the range of from about 25:1 to about 1:1, although lesser or higher amounts may be used depending upon the specific degree of enhanced stability desired and upon the specific particle size of the metal oxide particles. Preferably the weight ratio is in the range of about 15:1 to about 5:1.

When the stabilized particles are to be used in a textile size, the solution of polyacrylamide stabilized polymer resin encapsulated colloidal metal oxide particles further may contain urea in an amount of about 5 to 50% by weight of the polyacrylamide polymer. Preferably the amount of the urea is about 10 to 40 wt % of the weight of the polyacrylamide polymer. When urea is to be present, it can simply be added to any of the solutions before or after blending as above.

Having now generally described the invention, the same will become better understood by reference to the following specific examples, which are included herein for the purposes of illustration only and are not intended to be limiting of the invention. Unless otherwise specified, all parts and percents are by weight.

COMPARATIVE EXAMPLE A

A polymer encapsulated colloidal metal oxide particle solution is prepared by mixing 7 parts of an aqueous dispersion containing 40% 20 nanometer colloidal silica solids with 100 parts of an aqueous dispersion containing 25% solids polyester resin, the resin prepared from isophthalic acid, diethylene glycol, and trimellitic anhydride, and neutralized with monoisopropylamine, and having a number average molecular weight of about 5,000 daltons. (Polytech Inc., Greenville, S.C.)

Encapsulation is confirmed by heating a dried sample until the polyester is burned off (600° C., 2 hrs). The residue is a high-bulk, low density white powder of substantially individual particles, not agglomerated granules.

The product stability at room temperature is about 5–7 days, at which point a significant viscosity increase occurs. Complete gelation is observed between 2–3 weeks. Upon exposure to 53° C., the product is stable for only 24–36 hours.

EXAMPLE 1

The procedure of Comparative Example A is repeated except that 1250 parts of a 20% aqueous solution of polyacrylamide polymer (Callaway 4600) is added.

Encapsulation is confirmed as in Comparative Example A by heating a dried sample until the polyester is burned off (600° C., 2 hrs). The residue is a very finely divided white powder.

The product is stable at room temperature for more than 300 days, exhibiting no increase in viscosity or difference in burn-off result. Upon exposure to 530C, the product is stable for more than 21 days (504 hrs).

COMPARATIVE EXAMPLE B

The procedure of Example 1 is repeated except that the polyacrylamide polymer is replaced by each of the following:

1. Acrylic Polymers
   a. Sodium polyacrylate
   b. Potassium polyacrylate
   c. Ammonium polyacrylate
   d. Polyacrylate copolymers
   e. Cross-linked polyacrylic thickeners
2. Neutral inorganic salts
   a. Ammonium chloride
   b. Urea
3. Near neutral inorganic salt/organic salt mixtures
   a. Acetate salts
   b. Benzoate salts
4. Carbohydrates
   a. Sucrose
   b. Fructose
   c. Carboxy methyl cellulose
   d. Guar
5. Polyethylene oxide polymers
   a. PEG 200–3,000

None of these materials inhibit a viscosity build up when the compositions are exposed to 53° C. They demonstrate no improvement over the encapsulated colloidal silica with no additive.

EXAMPLE 2

A polyacrylamide stabilized polyester resin encapsulated colloidal silica solution is prepared as in Example 1 by combining (i) 7 parts of an aqueous dispersion containing 40% 20 nanometer colloidal silica solids with (ii) 100 parts of the 25% solids polyester resin dispersion and (iii) 850 parts of the 20% solids polyacrylamide polymer solution.

A size composition is prepared by combining 40 or 60 kg of a 24% solids product containing polyacrylamide stabilized encapsulated silica (also containing urea at a rate of 25% on polyacrylamide solids), 45.45 kg starch, and water (to 900 liters).

The resulting composition is evaluated as a textile size in a plant trial on 8 looms running 14.7'S, sulfur dyed cotton warp yarn, 5% add-on, over 5 shifts. The results in Table I show a weaving efficiency of 96.3% and no significant difference between the 40 kg and 60 kg loadings. The standard polyacrylamide-urea-starch size used at the plant at a loading of 40 kg (plus the same 45. 45 kg starch) provides a weaving efficiency of 92.5% on the same set of yarn.

TABLE I

Results of Weaving Test

| LOOM # | 39 | 115 | 130 | 168 | 285 | 245 | 156 | 25 | Avg. |
|---|---|---|---|---|---|---|---|---|---|
| Amt, kg | 40 | 40 | 40 | 40 | 60 | 60 | 60 | 60 | |
| 1 | 94.7 | 98.3 | 94.1 | 99.6 | 99.3 | 92.0 | 94.4 | 96.9 | 96.2 |
| 2 | 97.5 | 97.7 | 96.7 | 97.0 | 100.0 | 97.4 | 92.4 | 96.7 | |
| 3 | 96.3 | 95.1 | 96.4 | 94.2 | 97.4 | 94.5 | 96.0 | 97.5 | 95.9 |
| 4 | 96.0 | 95.1 | 96.4 | 99.8 | 97.2 | 94.0 | 97.7 | 97.7 | 96.6 |
| 5 | 97.8 | 92.6 | 96.7 | 96.4 | 98.1 | 96.4 | 98.5 | 98.5 | 96.3 |
| Avg. | 96.5 | 95.8 | 96.1 | 97.4 | 97.4 | 95.4 | 96.6 | 96.6 | |

EXAMPLE 3

The procedure of Example 2 is repeated with 6.5'S cotton indigo warp yarn. Urea is added to the polyacrylamide stabilized polyester encapsulated silica particles at a rate of 25% based upon the polyacrylamide solids.

| CONTROL FORMULATION | TRIAL FORMULATION |
|---|---|
| 100 lb starch | 100 lb starch |
| 33 lb sodium polyacrylate (30%) | 32.5 lb stabilized encapsulated Silica (24%) |
| Finish: 120 gal (10% solids) | Finish: 142 gal (8.3% solids) |
| Add-on: 9%. | Add-on: 7.5% |
| Weaving Eff.: 91.7% | Weaving Eff.: 96.5% |

EXAMPLE 4

The procedure of Example 1 is repeated except that the solution polymerized polyacrylamide polymer is replaced by Colsize-WLV, a water soluble dry polyacrylamide polymer of Ciba Corporation. 20 parts of the Colsize-WLV are dissolved in 80 parts water to form a 20% aqueous solution of polyacrylamide polymer having a viscosity of 5,000 cps is used.

Encapsulation is confirmed as in Comparative Example A by heating a dried sample until the polyester is burned off (600° C., 2 hrs). The residue is a very finely divided white powder.

The product is stable at room temperature. Upon exposure to 53° C., the product is stable for more than 6 days (144 hrs).

What is claimed is:

1. A method of stabilizing an aqueous polymer resin encapsulated colloidal metal oxide particle composition comprising adding thereto an amount of a water soluble polyacrylamide polymer sufficient to increase the stability of the polymer resin encapsulated colloidal metal oxide particles over compositions not containing the polyacrylamide polymer.

2. The method of claim 1, wherein the metal oxide particles are selected from the group consisting of silica, tin oxide, and antimony pentoxide.

3. The method of claim 1, wherein the polymer resin forms a sufficiently complete film around the colloidal metal oxide particles to prevent the particles from disassociating from the polymer resin and forming 3-dimensional inorganic polymer networks.

4. The method of claim 3, wherein the polymer resin is a polyester polymer resin.

5. The method of claim 4, wherein the polyester resin has a number average molecular weight of about 1,500 to about 7,000 daltons.

6. The method of claim 4, wherein the polyester polymer resin is prepared from isophthalic acid, diethylene glycol, and trimellitic anhydride.

7. The method of claim 1, wherein the polymer resin is used in an amount of about 3 to about 15 times the weight of the metal oxide particles.

8. The method of claim 1, wherein the water soluble polyacrylamide polymer has a viscosity of about 100 to 15,000 cps at 20% solids.

9. The method of claim 1, wherein the water soluble polyacrylamide polymer has a viscosity of about 400 to 2,500 cps at 20% solids.

10. The method of claim 1, wherein the polyacrylamide is used in an amount which produces a weight ratio of polyacrylamide polymer to polymer resin encapsulated metal oxide particles in the range of from about 25:1 to about 1:1.

11. The method of claim 1, wherein the polymer resin encapsulated colloidal metal oxide particle composition contains at least 15% solids.

12. An aqueous composition comprising (i) a complex formed of colloidal metal oxide particles and a polymeric resin in an aqueous medium, said particles being substantially encapsulated in said resin, and (ii) a water soluble polyacrylamide polymer, said complex being storable at room temperature for a longer period of time than the same polymer resin encapsulated colloidal metal oxide particle composition not containing the polyacrylamide polymer.

13. The composition of claim 12, wherein the metal oxide particles are selected from the group consisting of silica, tin oxide, and antimony pentoxide.

14. The composition of claim 12, wherein the polymer resin forms a sufficiently complete film around the colloidal metal oxide particles to prevent the particles from disassociating from the polymer resin and forming 3-dimensional inorganic polymer networks.

15. The composition of claim 14, wherein the polymer resin is a polyester polymer resin.

16. The composition of claim 15, wherein the polyester resin has a number average molecular weight of about 1,500 to about 7,000 daltons.

17. The composition of claim 15, wherein the polyester polymer resin is prepared from isophthalic acid, diethylene glycol, and trimellitic anhydride.

18. The composition of claim 12, wherein the polymer resin is present in an amount of about 3 to about 15 times the weight of the metal oxide particles.

19. The composition of claim 12, wherein the water soluble polyacrylamide polymer has a viscosity of about 15,000 cps and below at 20% solids.

20. The composition of claim 12, wherein the water soluble polyacrylamide polymer has a viscosity of about 400 to 2,500 cps at 20% solids.

21. The composition of claim 12, wherein the polyacrylamide is present in an amount which yields a weight ratio of polyacrylamide polymer to polymer resin encapsulated metal oxide particles in the range of from about 25:1 to about 1:1.

22. The composition of claim 12, wherein the polymer resin encapsulated colloidal metal oxide particle composition contains at least 15% solids.

23. A method of treating a fiber comprising applying thereto an aqueous composition comprising (i) a complex formed of colloidal metal oxide particles and a polymeric resin in an aqueous medium, said particles being substantially encapsulated in said resin, and (ii) a water soluble polyacrylamide polymer.

24. The method of claim 22, wherein the composition further comprises urea.

25. The method of claim 23, wherein the fiber is a textile yarn.

26. The method of claim 25, wherein the weaving efficiency of the yarn is increased.

27. The method of claim 26, wherein the weaving efficiency is increased by at least 1%.

* * * * *